United States Patent [19]

Perrow et al.

[11] Patent Number: 5,496,217
[45] Date of Patent: Mar. 5, 1996

[54] STROKING CONSTANT VELOCITY UNIVERSAL JOINT

[75] Inventors: Scott J. Perrow; Jon N. Miller, both of Saginaw, Mich.

[73] Assignee: General Motors Corporation, Detroit, Mich.

[21] Appl. No.: 270,553

[22] Filed: Jul. 5, 1994

[51] Int. Cl.⁶ .................................................. F16D 3/205
[52] U.S. Cl. ........................ 464/111; 464/123; 464/905
[58] Field of Search ..................................... 464/111, 122, 464/123, 124, 132, 905; 384/561, 564, 127

[56] References Cited

U.S. PATENT DOCUMENTS

| | | |
|---|---|---|
| 1,863,244 | 6/1932 | Goddard . |
| 3,613,396 | 10/1971 | Drevard et al. . |
| 4,224,806 | 9/1980 | Kobayashi . |
| 4,379,706 | 4/1983 | Otsuka et al. ........................ 464/111 |
| 4,472,157 | 9/1984 | Sindelar ................................ 464/124 |
| 4,484,900 | 11/1984 | Orain .................................... 464/111 |
| 4,747,803 | 5/1988 | Kimata et al. ....................... 464/111 |
| 4,810,232 | 3/1989 | Farrell et al. ........................ 464/111 |
| 4,840,600 | 6/1989 | White et al. ......................... 464/111 |
| 4,854,917 | 8/1989 | Mizukoshi ............................ 464/111 |
| 4,886,479 | 12/1989 | Richtmeyer et al. ................. 464/111 |
| 5,069,653 | 12/1991 | Mizukoshi ............................ 464/111 |
| 5,137,496 | 8/1992 | Sasaki et al. ........................ 464/111 |
| 5,224,899 | 7/1993 | Turner et al. ........................ 464/111 |
| 5,376,049 | 12/1994 | Welschof et al. ................... 464/111 |

Primary Examiner—Daniel P. Stodola
Assistant Examiner—William A. Rivera
Attorney, Agent, or Firm—Saul Schwartz

[57] ABSTRACT

A stroking constant velocity universal joint including a tulip housing having three longitudinal drive channels therein and a spider having three radial trunnions reaching into the drive channels. A cylindrical drive roller is disposed in each drive channel and has a radial bore therein with an inner convex surface around a cylindrical bearing race on the corresponding radial trunnion. A full complement of needle bearings is disposed in the clearance between each cylindrical bearing race and the corresponding inner convex surface. A pair of annular washers are mounted on each radial trunnion at opposite ends of the bearing race thereon. A counterbore in a side of each washer facing the corresponding drive roller has a diameter less than the minimum diameter of the inner convex surface in the drive roller and overlaps an end of the full complement of needle bearings to hold the needle bearings closer to the cylindrical bearing race than the inner convex surface of the drive roller.

4 Claims, 1 Drawing Sheet

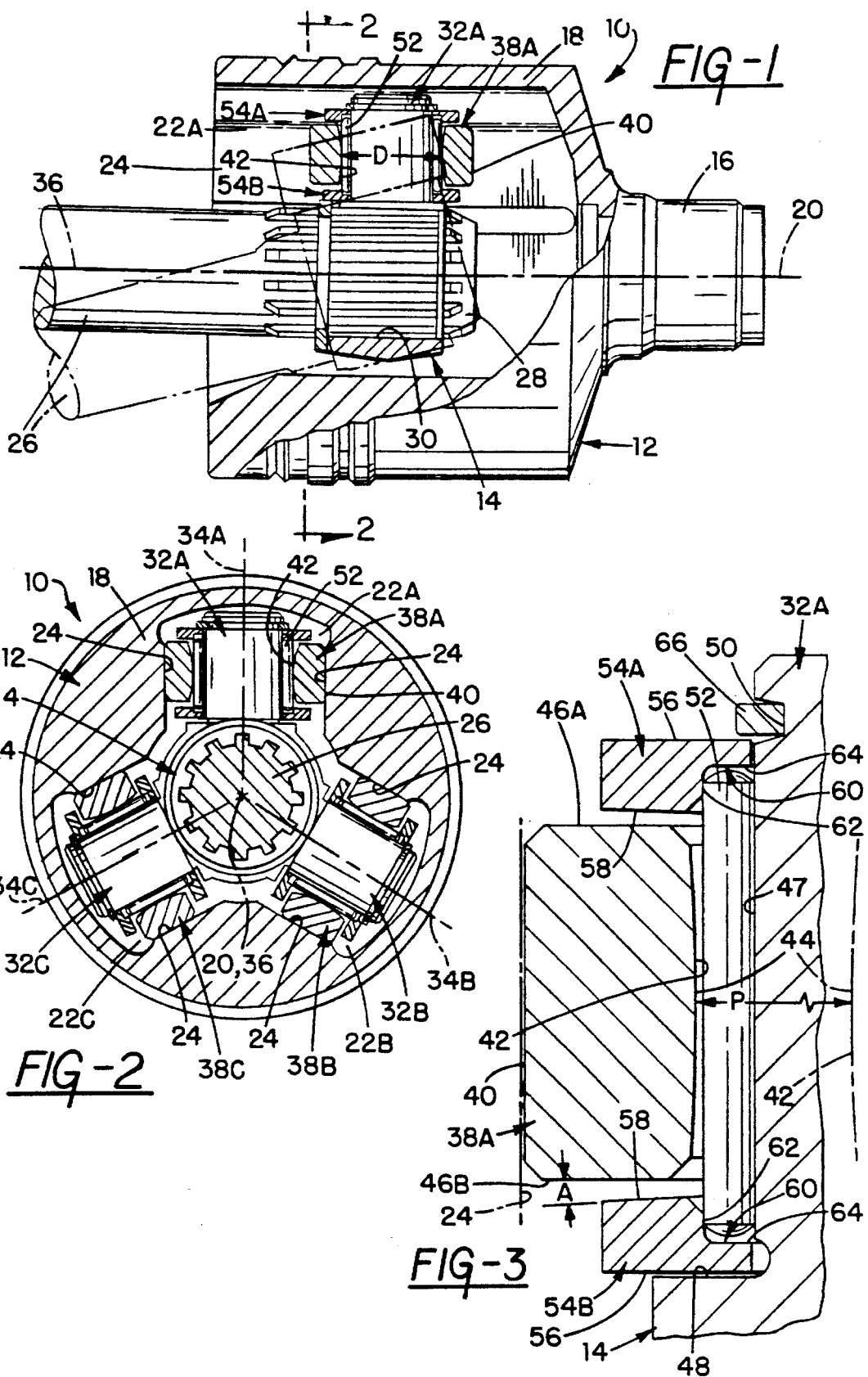

STROKING CONSTANT VELOCITY UNIVERSAL JOINT

FIELD OF THE INVENTION

This invention relates to a stroking constant velocity universal joint.

BACKGROUND OF THE INVENTION

U.S. Pat. No. 4,810,232, issued Mar. 7 1989 and assigned to the assignee of this invention, describes a stroking constant velocity universal joint suitable for application at the inboard location of a front wheel drive axle of a motor vehicle. The universal joint includes an outer drive member or tulip housing usually connected to a transaxle differential of the motor vehicle and an inner drive member or spider on an axle shaft. The spider has three radial trunnions reaching into three longitudinal drive channels in the tulip housing. A cylindrical drive roller in each longitudinal drive channel is mourned on a corresponding one of the radial trunnions for rotation about a radial centerline thereof by a full complement of needle-type roller bearings ("needle bearings") parallel to the radial centerline between a cylindrical bearing race on the trunnion and a radial bore in the drive roller. A full complement of needle bearings is the maximum number of needle bearings which can simultaneously engage the bearing race while maintaining a minimum bearing-to-bearing clearance necessary to prevent binding. The radial bore in each roller has an inner convex surface, flaring radially out from a minimum diameter at the crown of the convex surface at the middle of the radial bore to a maximum diameter at each end thereof, so that the drive rollers are permitted to tip relative to the corresponding radial centerlines. The radial clearance between the needle bearings and the surrounding convex surface, however, affords the needle bearings more latitude to skew, i.e. become non-parallel to the corresponding radial centerline, than otherwise obtains where the radial bore in the drive roller defines a plain cylinder closely surrounding the needle bearings. A stroking constant velocity universal joint according to this invention is an improvement relative to the stroking constant velocity universal joint described in the aforesaid U.S. Pat. No. 4,810,232.

SUMMARY OF THE INVENTION

This invention is a new and improved stroking constant velocity universal joint including an outer drive member or tulip housing having three longitudinal drive channels therein and an inner drive member or spider having three radial trunnions reaching into the drive channels. A cylindrical drive roller is disposed in each drive channel and has a radial bore therein with an inner convex surface around a cylindrical bearing race on the corresponding radial trunnion. A plurality needle bearings constituting a full complement is disposed in the radial clearance between each cylindrical bearing race and the corresponding inner convex surface. A pair of annular washers are mounted on each radial trunnion at opposite ends of the full complement of needle bearings. Each washer has a frustoconical side facing the corresponding drive roller and a counterbore in the center of the frustoconical side having a diameter less than the diameter of the crown of the inner convex surface of the corresponding drive roller. The side wall of each counterbore defines a retainer which holds the needle bearings close to the corresponding cylindrical bearing race to minimize skewing. The bottom of each counterbore defines a retainer which prevents longitudinal or endwise dislodgement of the needle bearings from the corresponding cylindrical bearing race. The cone angle of the frustoconical sides of the annular washers corresponds generally to the maximum tipping angle of each drive roller to prevent line-to-line contact between the drive rollers and the annular washers.

BRIEF DESCRIPTION OF THE DRAWINGS

FIG. 1 is a partially broken-away side view of a stroking constant velocity universal joint according to this invention;

FIG. 2 is a sectional view taken generally along the plane indicated by lines 2—2 in FIG. 1; and FIG. 3 is an enlarge view of a portion of FIG. 2.

DESCRIPTION OF A PREFERRED EMBODIMENT

A stroking constant velocity universal joint 10 according to this invention includes a cup-shaped outer drive member or tulip housing 12 and an inner drive member or spider 14. The tulip housing has a tubular neck 16 and an integral, generally cylindrical wall 18. The neck 16 of the tulip housing is usually rigidly connected to an element of a transaxle, not shown, of a motor vehicle front wheel drive for rotation as a unit therewith about a centerline 20. A plurality of inward opening drive channels 22A–C are formed in the cylindrical wall 18 of the tulip housing parallel to the centerline 20 and equally angularly spaced around the wall. Each drive channel is bounded on opposite sides by a pair of flat drive tracks 24 parallel to the centerline 20.

The spider 14 is rotatable as a unit with an axle shaft 26 through a spline connection between an end 28 of the shaft and a bore 30 in the spider. The spider 14 includes a plurality of radial trunnions 32A–C aligned on a corresponding plurality of equally angularly spaced radial centerlines 34A–C in a common plane perpendicular to a longitudinal centerline 36 of the shaft 26 which coincides with the centerline 20 unless the universal joint 10 is articulated. The trunnions protrude radially into corresponding ones of the drive channels 22A–C in the tulip housing between the drive tracks 24 thereof.

The spider 14 is connected to the tulip housing 12 by a plurality of cylindrical drive rollers 38A–C disposed between the trunnions 32A–C and the drive tracks 24 of the corresponding drive channels. The drive roller 38A, representative of the drive rollers 38B–C, includes a cylindrical outer wall 40 which rolls and slides on the tracks 24 and a radial bore 42 surrounding the spider trunnion 32A having an inner convex surface. The inner convex surface has a minimum diameter "D" at a crown 44 of the inner convex surface midway between a pair of opposite planar ends 46A–B of the drive roller 38A and flares outward to larger diameters where the inner convex surface intersects the planar ends.

The trunnion 32A has a cylindrical bearing race 47 thereon symmetric about the radial centerline 34A facing the inner convex surface of the drive roller 38A. The bearing race 47 is bounded at one end by an annular shoulder 48 on the spider 14 in a plane perpendicular to the radial centerline 34A and at the other end by a retaining ring groove 50 in the trunnion. A full complement of cylindrical needle bearings 52 is disposed in the generally annular clearance between the inner convex surface of the drive roller 38A and the bearing race 47.

A pair of annular washers 54A–B are disposed on the trunnion 32A at opposite ends of the cylindrical bearing race 47 thereon. Each washer 54A–B includes a flat side 56, a frustoconical side 58, and a counterbore 60 in the frustoconical side around an inside diameter of the washer. The sidewall of the counterbore 60 defines a cylindrical retaining surface 62. The bottom of the counterbore 60 defines an annular retaining surface 64. The diameter of the cylindrical retaining surface 62 is less than the minimum diameter "D" of the inner convex surface at the crown 44 thereof. The frustoconical side 58 of each annular washer has a cone angle "A", FIG. 3.

The annular washers 54A–B are mounted on the trunnion 32A with their frustoconical sides 58 facing corresponding ones of the planar sides 46A–B of the drive roller 38A. The flat sides 56 of the washers are disposed in planes perpendicular to the radial centerline 34A. Opposite distal ends of the needle bearings 52 protrude into the counterbores 60 in the washers 54A–B. Because the diameter of each retaining surface 62 is less than the minimum diameter "D", the retaining surfaces simulate a smaller diameter plain cylinder around the needle bearings 52 holding the full complement thereof closer to the cylindrical bearing race 47 than the inner convex surface of the drive roller. Accordingly, while the needle bearings are still effective in supporting the drive roller 38A on the radial trunnion 32A for rotation about the radial centerline 34A, the washers 54A–B minimize the likelihood of skewing of the needle bearings by limiting the separation between individual needle bearings.

The flat side 56 of the washer 54B seats against the annular shoulder 48 on the spider 14. The flat side 56 of the washer 54A seats against a retaining ring 66 on the trunnion 32A in the annular groove 50 therein. With the washers 54A–B thus retained axially on the trunnion, the annular retaining surfaces 64 thereon facing the ends of the needle bearings 52 prevent dislodgement of the needle bearings from the bearing race 47 in either direction parallel to the radial centerline 34A. At the same time, the frustoconical sides 58 extend radially outboard of the needle bearings 52 to prevent dislodgement of the drive roller 38A from the trunnion 32A in either direction parallel to the radial centerline 34A.

In operation, the inner convex surface radial bore 42 in the drive roller 38A permits the drive roller to tip relative to the radial centerline 34A and to wobble therearound when the drive roller rotates around the centerline 34A while tipped. The maximum angle through which the dimensions of the drive roller permit it to tip relative to the radial centerline 34A corresponds closely to the cone angle "A" of the frustoconical sides 58 of the washers 54A–B. Therefore, when the drive roller is tipped, the planar ends 46A–B thereof bear substantially flush against the frustoconical side 58 of one or the other of the washers 54A–B to maximize the area of contact between the drive roller and the washer and thereby minimize wear.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a stroking constant velocity universal joint including
    a shaft having a longitudinal centerline,
    a spider on said shaft having three radial trunnions each defining a cylindrical bearing race symmetric about a corresponding one of three radial centerlines of said spider in a common plane perpendicular to said longitudinal centerline of said shaft,
    three cylindrical drive rollers each including a pair of planar ends and a bore therethrough, defined by an inner convex surface, said bore having a minimum diameter at the crown of said inner convex surface,
        said drive rollers being disposed around respective ones of said radial trunnions with said inner convex surfaces thereof facing said cylindrical bearing races on said respective trunnions, and
    a full complement of needle rollers on each bearing race whereby said drive rollers are supported on said respective radial trunnions for rotation about said corresponding radial centerlines and for tipping relative to said corresponding radial centerlines through a predetermined tipping angle,
    the improvement comprising:
    a pair of annular washers on each radial trunnion at opposite ends of said cylindrical bearing race thereon each including
        a first side facing one of said planar ends of said corresponding drive roller and engageable thereon,
        a second side opposite said first side, and
        a counterbore in said first side having a side wall defining a cylindrical retaining surface around an end of said full complement of needle bearings the diameter of which is less than said minimum diameter of said inner convex surface in said corresponding drive roller and a bottom defining an annular retaining surface in a plane perpendicular to said corresponding radial centerline adjacent an end of said full complement of needle bearings, and
    means on each of said radial trunnions operative to prevent dislodgement therefrom in said direction of said corresponding radial centerline of each of said pair of annular washers thereon.

2. The stroking constant velocity universal joint recited in claim 1 wherein:
    said first side of each of said annular washers is a frustoconical side having a cone angle generally equal to said predetermined tipping angle of each of said drive rollers relative to said corresponding one of said radial centerlines.

3. The stroking constant velocity universal joint recited in claim 2 wherein:
    said second side of each of said annular washers is a flat side in a plane perpendicular to said corresponding one of said radial centerlines.

4. The stroking constant velocity universal joint recited in claim 3 wherein said means on each of said radial trunnions operative to prevent dislodgement therefrom in said direction of said corresponding radial centerline of each of said pair of annular washers thereon includes:
    means defining three annular shoulders on said spider each respectively at an inboard end of a one of said cylindrical bearing races in a plane perpendicular to said corresponding radial centerline and engageable on said flat second side of a first one of said pair of annular washers, and
    three annular retaining rings on said spider each in a groove at an outboard end of a respective one of said cylindrical bearing races engageable on said flat second side of a second one of said pair of annular washers.

* * * * *